United States Patent
Van Dongen et al.

[11] Patent Number: 5,736,612
[45] Date of Patent: Apr. 7, 1998

[54] PROCESS FOR MANUFACTURING ISOPRENE CONTAINING BLOCK COPOLYMERS

[75] Inventors: Arie Van Dongen; Helmuth Einberger; Jeroen Van Westrenen, all of Amsterdam, Netherlands

[73] Assignee: Shell Oil Company, Houston, Tex.

[21] Appl. No.: 590,712

[22] Filed: Aug. 19, 1996

[30] Foreign Application Priority Data

Jan. 24, 1995 [EP] European Pat. Off. ............ 95300424

[51] Int. Cl.[6] .................................................. C08F 297/04
[52] U.S. Cl. ............................. 525/314; 22/250; 22/316
[58] Field of Search .................................. 525/314, 316, 525/250

[56] References Cited

U.S. PATENT DOCUMENTS

| | | | |
|---|---|---|---|
| 5,171,791 | 12/1992 | Marchand et al. | 525/314 |
| 5,242,984 | 9/1993 | Dillman et al. | |
| 5,296,547 | 3/1994 | Nestegard et al. | |
| 5,447,995 | 9/1995 | Hoxmeier et al. | 525/314 |

FOREIGN PATENT DOCUMENTS

| | | | |
|---|---|---|---|
| 0330764 A1 | 3/1988 | European Pat. Off. | C08L 53/02 |
| 0316857 A2 | 11/1988 | European Pat. Off. | C08F 4/48 |
| 0379951 A2 | 1/1990 | European Pat. Off. | C08F 297/00 |
| 0387671 A1 | 3/1990 | European Pat. Off. | C08F 2/42 |
| 0413294 A2 | 8/1990 | European Pat. Off. | C08F 297/02 |
| 0472749 A1 | 8/1990 | European Pat. Off. | C08F 4/48 |
| 0525905 A1 | 7/1992 | European Pat. Off. | C08F 297/04 |
| 106260 | 7/1993 | Romania. | |
| 94/17115 | 1/1994 | WIPO | C08F 297/04 |
| 94/22931 | 10/1994 | WIPO | C08F 297/04 |

OTHER PUBLICATIONS

Encyclopedia of Polymer Science and Engineering, J. Wiley & Sons, 1985, v2, pp. 6–7.

*Primary Examiner*—Irina S. Zemel
*Attorney, Agent, or Firm*—Donald F. Haas

[57] ABSTRACT

Process for manufacturing block copolymers derived from predominantly styrene and predominantly isoprene, used in the form of an isoprene concentrate obtainable by contacting an isoprene concentrate, obtainable by removal of piperylene from a gasoline pyrolysis fraction of hydrocarbons having 5 carbon atoms, with finely dispersed alkali metal and/or alkaline earth metal, and separating it from the free and bound metal, said process comprising at least the steps of polymerizing predominantly styrene monomer in an inert non-aromatic hydrocarbon solvent in the presence of a monofunctional organolithium initiator, adding predominantly isoprene monomer in the form of pretreated isoprene concentrate to the polymerization mixture, either adding a coupling agent to couple a predominant part of the living diblock copolymer or adding a second portion of predominantly styrene monomer, and adding a terminating agent.

13 Claims, No Drawings

5,736,612

PROCESS FOR MANUFACTURING ISOPRENE CONTAINING BLOCK COPOLYMERS

FIELD OF THE INVENTION

The present invention relates to an improved process for manufacturing isoprene containing block copolymers. More in particular the present invention relates to a process for manufacturing linear or multiarmed radial isoprene containing block copolymers by means of anionic polymerization initiated by a monofunctional initiator.

BACKGROUND OF THE INVENTION

Styrene-conjugated diene styrene block copolymers and in particular styrene-isoprene styrene block copolymers presently form a predominant key building ingredient for hot melt pressure sensitive adhesive compositions, flexographic printing plates and polymer blending.

As was known from e.g. "New Styrene Block Copolymers for Tape and Label use", F. C. Jagisch and J. M. Tancrede, PSCT Seminar Proceedings, May 1990, it has been generally accepted that a majority of styrene-conjugated diene block copolymers (further to be mentioned SBC's) to be used in hot melt pressure sensitive adhesive compositions are formed by block copolymers of the structures ABA or $(AB)_nX$, wherein A represents a polystyrene block and B represents a poly(conjugated diene) and more preferably poly(butadiene), poly(isoprene), poly(butadiene/isoprene or ethylene/butylene random copolymer. Three dominant commercial preparation methods for such SBC's have been developed:

(a) the traditional coupling method, involving the steps of synthesis of relatively low molecular weight poly(styrene) polymer blocks by monofunctional anionic initiation of styrene, addition of one or more conjugated dienes to form "living" poly(styrene-conjugated diene) segments or diblocks, and coupling these anionic living diblocks to yield linear styrene-conjugated diene-styrene copolymer or—by using multifunctional coupling agents—multiarmed or radial copolymers, said coupling giving rise to the presence of a certain amount of uncoupled terminated diblock since the coupling process does not provide 100 percent conversion, (b) sequential synthesis of a linear triblock copolymer ABA by initial synthesis of a diene midblock using a difunctional initiator, wherein the chain is growing from the center outward in both directions, addition of styrene which reacts with the dienyl anion chain ends to form polystyrene endblocks, and termination with a suitable proton donor, and (c) sequential synthesis of a linear triblock copolymer ABA by initial synthesis of a living polystyrene block through a monofunctional initiator, addition of conjugated diene and completing its polymerization, addition of a second portion of styrene and completing its polymerization, and termination with a suitable proton donor.

It was generally known that specific measures had to be taken during the manufacture of said SBC's, intended to be used in hot melt adhesive compositions and flexographic printing plates. Said SBC's had to be color stable and heat resistant under preparation and processing conditions of the hot melt adhesive compositions and flexographic printing plates, whereas said SBC's had also to retain their other physical properties.

In particular there was still a strong need for improved color stable and heat resistant SBC's showing a standardized high quality within a narrow manufacturing specification.

A great variety of proposals was made to solve this problem, in general directed on the avoidance of the use of specific halogen-containing coupling agents, the use of specifically selected antioxidant additives to stabilize the poly(conjugated diene) phase during the polymer transformation stage and/or the use of specifically selected acids to be used for the neutralization of the living terminal alkali metals and in particular lithium resulting from the initiation, such as disclosed in European patent application no. 0387671 and 0379951.

With reference to the actual anionic polymerization step, during the last ten years extensive research and development efforts were spent to reach further improvements in the polymerization step by means of a difunctional or monofunctional lithium initiator which could provide block copolymers, which show a highly standardized, reliable quality within the predetermined specification, which have been derived from styrene, optionally mixed with minor amounts of structurally related monomers, and isoprene, optionally mixed with minor amounts of structurally related conjugated dienes, and the main physical properties of which could meet the present requirements.

Such research and development efforts clearly appeared from e.g. the following publications:

From the European patent application no. 0316857 an anionic polymerization process was known, using an initiator mixture comprising (a) a multifunctional lithium containing compound; and (b) an organic di- or tri amine of the formula $R''_2N—R^1(—R'')N—R')_nNR''_2$ wherein $R^1$ is an alkadiyl group, which optionally has been inertly substituted, containing 2–20 carbon atoms in the main chain, wherein $R''$ is an alkyl group having 1 to 20 carbon atoms, which optionally have been inertly substituted, and wherein n=0 or 1. In particular a polymerisation initiator composition was disclosed, comprising a hydrocarbon solvent and an initiator mixture of components (a) and (b) with a ratio of mols (b) per equivalent of (a) of 0.005–1:1.

In addition the initiator composition may contain lithium alkoxide having 2–16 carbon atoms. With said initiator compositions it was indicated that in particular telechelic and/or block copolymers of narrower molecular weight distribution could be prepared, to make them suitable for use in adhesives with improved shear hold strength.

From the European patent application no. 0413.294 was known to prepare narrow molecular weight distribution isoprene block copolymers of the formula B—$B^1$—X—($B^1$—B) or A—B—$B^1$—X($B^1$—B—A) wherein A was a block of non-elastomeric monomer, B was a block of isoprene, $B^1$ was a block of butadiene and X was the remnant of a hydrocarbon-soluble difunctional lithium initiator. The block copolymers had a molecular weight idstribution Mw/Mn of less than 1.06.

In particular a process embodiment was disclosed, wherein butadiene (1–25 wt % of the dienes and preferably 5–15%) was polymerised before isoprene and the polymerisation was conducted in the presence of an aliphatic triamine. The Li-based initiator was indicated to be in particular 1,3- or 1,4-phenylene bis(3-methyl-1-phenyl pentilydene)bis lithium or 1,3- or 1,4 phenylene bis(3-methyl-1-(4-methyl)penylidene) bis lithium.

From the European patent application no. 0472749 a process was known for blanking a reaction mixture, comprising contaminating amounts of a proton donating reactive impurity by adding sufficient blanking agent of a very specific structure, at 30°–90° C., to remove these impurities.

European patent application 0 330.764 disclosed block copolymer compositions, comprising diblock copolymers $A_1B_1$ derived from an aromatic vinyl compound and a conjugated diene, wherein, $A_1$ being <20 wt % of $A_1+B_1$, and triblock copolymers $A_2B_2A_3$, wherein $A_2+A_3$ being >20 wt % of $A_2+B_2+A_3$ and Mw $B_2 \leq$ Mw $B_1 \times 1.5$, tackifying resin and softener. The triblock copolymers were obtained by fully sequential polymerization of styrene and isoprene (preparations of SIS linear block copolymers 1–4), and showed varying poly(styrene) block molecular weights and styrene contents.

From U.S. Pat. No. 5,171,791 adhesive formulations were known, which comprised block copolymers of e.g. isoprene or butadiene and styrene, prepared by means of a process, comprising anionic sequential polymerization of monomers selected from styrene and isoprene by means of a dilithium initiator (examples 1 and 2) or from styrene and butadiene, by means of a mono lithium initiator, terminating the polymerization with a proton donating agent, such as water or alcohols, resulting in the formation of a lithium salt of the terminating agent; and neturalizaing the alkali metal salt by contacting the reaction mixture obtained with a specific amount of phosphoric acid.

From European patent application 0525905 sequentially polymerized styrene-isoprene-styrene block copolymers, to be used in adhesive compositions were known, which had a styrene content of from 17 to 25% and a diblock content of less than 4%.

PCT patent application WO 94/22931, disclosed a process for manufacturing mixtures of said tri block copolymers and a well controlled amount of diblock copolymers, having corresponding blocks in common with the triblock copolymers.

Said process comprised the steps of:

(1) polymerizing vinyl aromatic monomer and in particular styrene in an inert hydrocarbon solvent in the presence of an organolithium initiator until substantially complete conversion;

(2) adding conjugated diene monomer, and in particular isoprene, to the polymerization mixture and allowing said conjugated diene monomer to polymerize until substantially complete conversion;

(3) adding a second portion of organolithium initiator, followed by the addition of a second portion of conjugated diene monomer and allowing said conjugated diene monomer to polymerize until substantially complete conversion;

(4) adding a second portion of vinyl aromatic monomer and allowing said monomer to polymerize until substantially complete conversion; and (5) adding a terminating agent.

The preceding discussed patent literature was clearly focussed on the manufacture of standardised high quality block copolymers, starting from extensively purified monomers. On the other hand there also was a strong aim to reduce the cost price of said block copolymers.

Romanian patent no. 106260 disclosed a process for the preparation of linear styrene-isoprene-styrene block copolymers by sequential anionic polymerization, using an isoprene concentrate obtained from the $C_5$ fraction of pyrolysis of gasoline, after separation of the piperylene fraction, said block copolymers having a styrene content between 10 and 40% and preferably from 15 to 30%. Said polymerization was carried out in three steps in an aromatic hydrocarbon, and in particular toluene, as solvent, starting from an isoprene concentrate obtained from the $C_5$ fraction of pyrolysis of gasosline, after separation of the piperylene fraction, and containing isoprene in an amount of at least 40 wt %, preferably of from 50 to 70 wt %, isopentane, n pentane, n-pentene, 2-methyl-1-butene and 2-methyl-2-butene as most important constituents, and at a temperature of 60° C. and using a molar ratio of n-butyllithium to styrene in the range of from 0.003 to 0.01.

However, block copolymers obtained by this process were found not to be able to provide the highly standardized, reliable quality properties, which were required for the present end use applications and in particular the use in adhesives, aimed at. Moreover the use of aromatic solvents on an industrial manufacturing scale cannot be regarded as being of practical interest, due to environmental and safety regulations.

It will be appreciated that inspite of the extensive research and development efforts aiming at a well controllable, low cost manufacturing process for highly standardized quality, block copolymers, tailor made within predetermined narrow range specifications, such a process was not to be provided until now, whereas on the other hand the need for a manufacturing process, working at lower costs and providing the hereinbefore specified block copolymers, has still increased.

Therefore it is an object of the present invention to provide a process for the manufacturing of block copolymers, optionally mixed with adjustable predetermined amounts of diblock copolymers, having corresponding block segments, by means of anionic polymerization, having highly standardized reliable tailor made properties within an adjustable narrow specificaiton range and having significantly lower operational costs.

Other objects of the present invention are formed by the block copolymers so obtained and hot melt adhesive compositions, thermoplastic polymer blends or flexographic printing plates, comprising said linear block copolymers.

As a result of extensive research and experimentation such a manufacturing process aimed at now has been surprisingly found.

SUMMARY OF THE INVENTION

Accordingly, the present invention includes a process for manufacturing block copolymers derived from predominantly styrene and from predominantly isoprene, used in the form of an isoprene concentrate, obtainable by contacting an isoprene concentrate obtainable by removal of piperylene from a fraction of hydrocarbons having 5 carbon atoms of gasoline pyrrolysis, with a dispersed alkali metal and/or alkaline earth metal, and preferably sodium, and separating it from the free and bound metal. The process includes polymerizing predominantly styrene monomer in an inert non aromatic hydrocarbon solvent in the presence of an organolithium initiator, and adding predominantly isoprene monomer in the form of a pretreated isoprene concentrate to the polymerization mixture.

DETAILED DESCRIPTION OF THE INVENTION

The present invention includes a process for manufacturing block copolymers derived from predominantly styrene and from predominantly isoprene, used in the form of an isoprene concentrate, obtainable by contacting an isoprene concentrate obtainable by removal of piperylene from a fraction of hydrocarbons having 5 carbon atoms of gasoline pyrrolysis, with a dispersed alkali metal and/or alkaline earth metal, and preferably sodium, and separating it from the free and bound metal, said process comprising at least the following steps:

(a) polymerizing predominantly styrene monomer in an inert non aromatic hydrocarbon solvent in the presence of an organolithium initiator until substantially complete conversion;

(b) adding predominantly isoprene monomer in the form of a pretreated isoprene concentrate to the polymerization mixture and allowing said predominantly isoprene monomer to polymerize until subtantially complete conversion;

(c1) either adding a coupling agent to couple a predominant part of the living diblock copolymer, or;

(c2) adding a second portion of predominantly styrene monomer and allowing said styrene monomer to polymerize until substantially complete conversion; and (d) adding a terminating agent.

With the terms "predominantly styrene" and "predominantly isoprene" is meant, that styrene or isoprene are to be regarded as main polymer segment constituents which optionally may have been mixed with minor amounts (less than 40 wt % and preferably less than 25 wt % of the respective total monomer feed). For example the styrene main monomer optionally may be mixed with controlled predetermined amounts of structurally related monomers, such as α-methystyrene, p-methylstyrene, m-methylstyrene, o-methylstyrene, p-tert-butylstyrene, α-dimethylstyrene, 1- or 2- vinylnaphtalene or with monomers which mainly constitute the other block segment.

On the other hand the pretreated isoprene main monomer may optionally be mixed with minor amounts of structurally related monomers such as butadiene, piperylene, 1-3-pentadiene, 3-hexadiene, 2,3-dimethyl-1,3-butadiene and the like.

According to a more preferable embodiment of the present process substantially pure styrene is used and no additional conjugated dienes are mixed with the pretreated isoprene concentrate.

It will be appreciated that according to the process embodiments, comprising the steps (a), (b) or (c.1) multi-armed radial block copolymers or linear triblock copolymers are formed; and that according to the process embodiments comprising the steps (a), (b) and (c.2) fullsequentially polymerised linear triblock copolymers are formed.

It will be appreciated that, dependent on the specific end use of the block copolymer composition, between the steps (b) and (c.2), optionally a second portion of monofunctional organolithium initiator may be added to the reaction mixture, followed by addition of a second portion of predominantly isoprene monomer and allowing said isoprene monomer to polymerise until substantially complete conversion.

According to another practical embodiment it may be desired, dependent on the specific end use of the block copolymer composition, to add just after the steps (c.1) or (c.2) a predetermined amount of diblock copolymers, containing about the same poly(styrene) segment as the main block copolymer, or to add a predetermined amount of terminated diblock copolymer after step (d).

Preferably as coupling agent in step (c.1) a non halogen containing coupling agent is used, with reference to the desired avoidance of included lithium halide traces in the final block copolymers.

The coupling agent must have at least two functional groups, such as diethyladipate, dimethyladipate, phenylbenzoate, methyl benzoate, carbon dioxide, but can have more functional groups to form multiarmed radial block copolymers such as divinylbenzene, tetramethoxysilan, bis(trimethoxysilyl) ethane, TNPP, gamma GPTS.

It will be appreciated that the isoprene main monomer concentrate, obtained by the pre treatment step and used as starting material for the actual anionic polymerization reaction, is diluted with other hydrocarbons, which have appeared not to interfere with said polymerization reaction.

The detrimental effect of for example, allenes, cyclopentadienes, isopropenyl-acetylene, acetone, metacrolein, methylethyl ketone methyl-vinyl-ketone, which have been found to interfere with said polymerization reaction and/or deteriorate the final physical properties, and which were normally present in minor but varying, significant amounts, has appeared to be adequately eliminated by said metal pretreatment, providing a relatively very cheap diluted isoprene starting monomer, which surprisingly has been found to be used for the manufacture of block copolymers which can meet the severe requirements of the modern applications, as depicted hereinbefore.

Said pretreated isoprene monomer concentrate, provided as a result of the pretreatment, with dispersed metal and preferably sodium, normally contains in the range of from 15–85 wt % isoprene and preferably from 50–80 wt %. The pretreatment process of the isoprene containing starting feedstock is in general carried out with alkali metal or alkaline earth metal and preferably sodium particles, dispersed in an inert dispersion medium, which must have a boiling range starting on at least 180° C. and more preferably 190° and higher. Preferably this dispersion medium is a naphtenic or paraffinic oil or mixtures thereof, of which paraffinic oils are preferred.

Said metal and preferably sodium dispersion can be obtained by thoroughly mixing e.g. molten sodium into the dispersion medium at a temperature of from 150° to 100° C. until sodium particles are obtained of a size in the range of from 5 to 50 micron.

In general, contacting the starting isoprene containing feedstock takes place in a usual column wherein the hot freshly prepared sodium dispersion is introduced together with the isoprene containing feedstock in countercurrent stream, with the isoprene containing feedstock. Adequate purification of the crude isoprene feedstock in general can be reached in such processes, if and as far as the active sodium concentration is adjusted dependent on to the content of contaminants and preferably to be between 0.5 and 2.0 wt %, relative to the weight of the total reaction mixture. The preferred actual purification is carried out at a maximum temperature of 60° C. and preferably at a temperature in the range of from 50° to 55° C.

With the term "inert non aromatic hydrocarbon solvent" are meant alkanes having from 5 to 8 carbon atoms, cycloalkanes having from 5 to carbon atoms or mixtures thereof. Preferably cyclohexane, cyclopentane, n-pentane n-hexane or isopentane or mixtures thereof are used.

More preferably cyclohexane, mixed with minor amounts of isopentane($\leq$40 wt %), or pure cyclopentane are used.

As organolithium initiator preferably n-alkyllithium compounds having from 4–6 carbon atoms, are used as initiator. Preferably n-butyllithium, sec-butyllithium are used, of which sec-butyllithium is most preferred.

It will be appreciated that the preparation of the preferred linear triblock constituent, optionally mixed with a controlled predetermined amount of corresponding diblock copolymer, obtainable by reinitiaton, can be carried out in one single reactor equippped with a recycling condensor or in a dual reactor system.

As terminating agent can be used primary alcohols or secondary alcohols, e.g. methanol, ethanol, 2-ethyl hexanol, or a monoepoxy compound, e.g. ethylene oxide, propylene oxide or phenylglycidylether. Alcohols are the preferred terminating agents.

It will be appreciated that the block copolymer(s) obtained by the hereinbefore specified process can be recovered by hot water and/or steam coagulation and subsequent dewatering and/or drying. The drying of the block copolymer in order to remove the last amounts of adhering water can be carried out in a fluidized bed dryer, a hot air belt dryer or in a closed evaporator/dryer, wherein a rotating shaft provided with several heated self cleaning arms, which move along fixed partition plates.

It will be appreciated that according to the hereinbefore specified polymerization process steps, multiarmed radial block copolymers or linear triblock copolymers, which may be mixed with well controlled predetermined amounts of diblock copolymers of a reliable standard quality, can be manufactured starting from a very cheap isoprene starting material.

The block copolymers obtainable according to the process of the invention have normally an apparent total number average molecular weight in the range of from 25,000 to 500,000 whereas the poly(styrene) block segments have an apparent number average molecular weight in the range of from 5,000 to 25,000. The preferred linear triblock copolymers preferably have apparent number average molecular weights in the range of from 75,000 to 270,000. The block copolymer usually have a styrene content in the range of from 10 to 50 wt % relative to the weight of the total block copolymer.

In general the adjusted diblock content, being dependent on the final end use application, will vary from 0 to 40 wt %, relative to the weight of the complete block copolymer mixture.

In particular the poly(isoprene) blocks of the triblock copolymers and optionally accompanying diblock copolymers to be obtained according to the process of the present invention, have apparent number average molecular weights in the range of from 15,000 to 250,000 and preferably in the range of from 50,000 to 220,000.

Most preferred number average molecular weights of the poly(styrene) block segments are ranging from 8,000 to 20,000.

In particular, tailor made triblock copolymer/diblock copolymer mixtures can be manufactured, having the formulae A—B—B'A' and B'A', wherein the molecular weight ratio A' (triblock)/A' (diblock) is in the range of from 0.9 to 1.1 and more preferably equal to 1. On the other hand the molar weight ratio B'/B—B' in these block copolymer mixtures is in the range from 0.3 to 0.7 and preferably about 0.5.

It will be appreciated that the tailor made highly standardized quality block copolymers as initial result of the present manufacturing process, can be stabilized during storage and under the subsequent use processing conditions by a variety of commercially available suitable stabilizers and combinations thereof. The choice of a specific stabilizer of a specific block copolymer will heavily depend on the final end use processing conditions.

As suitable examples can be mentioned IONOL, IRGANOX 1076, IRGANOX 565, SUMILIZER GM, ULTRANOX 626, IRGAFOS168, POLYGARD HR, NAUGARD 445 and the like.

It will be appreciated by an average person skilled in the art as very surprising that a further relatively simple additional treatment of the isoprene containing $C_5$ feedstock, i.e. isoprene concentrate, intially obtained from gasoline pyrolysis and removal of the piperylene fraction with dispersed sodium could enable the manufacture of the tailor made highly standardized quality block copolymers, meeting the present severe requirements from the end users. In particular in the earlier cited Romanian patent no. 106260, only reference was made to extractive distillation to remove the piperylene fraction from the initial crude feedstock leading to isoprene containing feedstock, (isoprene concentrate) giving inferior block copolymer products only. Not any reference was made in this patent to the further removal of trace constituents of such isoprene containing feedstock, such as cyclodienes and/or allenes, which clearly have been found now to make impossible any manufacturing process for the desired highly standardized quality block copolymers.

The invention is further illustrated by the following examples however without restricting its scope to these specific embodiments.

EXAMPLES 33 g of styrene were added to 6 liter of cyclopentane at 50° C., after which 3.04 mmol sec-butyl lithium were added. The reaction was completed after 40 minutes. Hereafter, 302 g of sodium treated 62% isoprene concentrate (comprising typically 12% n-pentane, 8% pentene-1, 12% 2-methyl-1-butene, 0.1% isopentane, 5.5% 2-pentene) were added. The polymerisation was allowed to proceed at 70° C. for 70 minutes. Then 1.14 mmol of sec-butyl lithium were added immediately followed by the addition of 384 g of sodium treated 62% isoprene concentrate. The polymerisatin was allowed to proceed for 90 minutes at 70° C. A final portion of 42 g styrene was added and polymerisation was allowed to proceed for 20 minutes at 70° C. 0.5 mL Ethanol was added as a terminating agent to quench the styrenyl anion.

The polymer was stabilised with 0.1% IRGANOX 565 and 0.3% TNPP and isolated by steam stripping to give white crumbs.

The product P1 was analysed by ASTM D 3536 (see Table I).

Comparative Example 1

The procedure of example 1 was repeated, except that the same untreated 62% isoprene concentrate was used. This isoprene concentrate was treated using ALCOA only to reduce the water content to 5 ppm.

Product P2. Due to excessive die-out no triblock was formed.

Example 2

40 g of styrene were added to 6 liter of cyclopentane at 50° C., after which 3.42 mmol sec-butyl lithium were added. The reaction was completed after 40 minutes. Hereafter, 705 g of sodium treated 19% isoprene concentrate (comprising typically 42% n-pentane, 9% pentene-1, 19% 2-methyl-1-butene, 0.5% isopentane, 11% 2-pentene) were added. The polymerisation was allowed to proceed at 70° C. for 70 minutes. Then 1.1 mmol of sec-butyl lithium were added immediately followed by the addition of 900 g sodium treated 62% isoprene. The polymerisation was allowed to proceed for 90 minutes at 70° C. A final portion of 51 g styrene was added and polymerisation was allowed to proceed for 20 minutes at 70° C. 0.5 mL Ethanol was added as a terminating agent to quench the styrenyl anion.

The polymer was stabilized with 0.5% IRGANOX 565 and 0.3% TNPP and isolated by steam stripping to give white crumbs.

The product P3 was analysed by ASTM D 3536 (see Table I).

Comparative Example 2

The procedure of example 2 was repeated excepted that the same untreated 19% isoprene concentrate was used. This isoprene concentrate was treated using ALCOA only to reduce the water content to 5 ppm.

Product P4. Due to excessive die-out no triblock was formed.

Example 3

370 g of styrene were added to 23 liter of cyclohexane at 50° C., after which 31 mmol sec-butyl lithium were added. The reaction was completed after 40 minutes. Hereafter, 2235 g of sodium treated 62% isoprene concentrate (comprising typically 12% n-pentane, 8% pentene-1, 12% 2-methyl-1-butene, 0.1% isopentane, 5.5% 2-Pentene) were added. The polymerisation was allowed to proceed at 60° C. for 70 minutes. Then 2.4 g of GPTS were added to couple the 'living' polymer. The reaction was allowed to proceed for 20 minutes at 60° C.

The polymer was stablised with 0.1% IRGANOX 565 and 0.3% TNPP and isolated by steam stripping to give white crumbs.

The product P5 was analysed by ASTM D 3536 (see Table I).

Example 4

370 g of styrene were added to 23 liter of cyclohexane at 50° C., after which 31 mmol sec-butyl lithium were added. The reaction was completed after 40 minutes. Hereafter, 2235 g of sodium treated 19% isoprene concentrate (comprising typically 42% n-pentane, 9% pentene-1, 19% 2-methyl-1-butene, 0.5% isopentane, 11% 2-pentane) were added. The polymerisation was allowed to proceed at 60° C. for 70 minutes. The 5.2 g of EPIKOTE 828 (trademark) were added to couple the 'living' polymer. The reaction was allowed to proceed for 20 minutes at 60° C.

The polymer was stabilised with 0.1% IRGANOX 565 and 0.3% TNPP and isolated by steam striping to give white crumbs.

The product P6 was analysed by ASTM D 3536 (see Table I).

TABLE I

| Polymer | MW SIS[1] (kg/mol) | MW SI[1] (kg/mol) | CE[2] (%) |
|---------|--------|-------|-----|
| P1 | 207 | 105 | 82 |
| P2 | not formed | 11.6 | |
| P3 | 150 | 75 | 81 |
| P4 | not formed | 12.8 | |
| P5 | 223 | 80 | 88 |
| P6 | 145 | 75 | 80 |

[1]Apparent number average molecular weight by ASTM D3536 as detected by UV absorption.
[2]CE (couple efficiency): in case of P1 and P3 CE represents the ratio of triblock to diblock plus triblock). For P5 and P6 it represents the ratio of the amounts of linear, 3 branched, and 4 branched block copolymer to the amount of diblock copolymer before the coupling was carried out.

We claim:

1. A process for manufacturing block copolymers derived from predominantly styrene and predominantly isoprene, said process comprising the steps of:

polymerizing predominantly styrene monomer in an inert non aromatic hydrocarbon solvent in the presence of a monofunctional organolithium initiator until substantially complete conversion;

adding predominantly isoprene monomer in the form of pretreated isoprene concentrate to the polymerization mixture and allowing said predominantly isoprene monomer to polymerize until substantially complete conversion, the pretreated isoprene concentrate being obtained by removal of piperylene from a gasoline pyrolysis fraction of hydrocarbons having 5 carbon atoms, contacting the isoprene concentrate with finely dispersed alkali metal or alkaline earth metal, and separating the isoprene concentrate from the free and bound metal;

either adding a coupling agent to couple a predominant part of the living diblock copolymer, or adding a second portion of predominantly styrene monomer and allowing said styrene monomer to polymerize until complete conversion; and adding a terminating agent.

2. The process according to claim 1, wherein the substantially pure styrene and the pretreated isoprene concentrate are used as the monomers without any additional conjugated dienes.

3. The process according to claim 1, wherein the isoprene content in the pretreated isoprene concentrate is in the range of from 50 to 80 wt %.

4. The process according to claim 1, wherein the pretreatment of the iosprene concentrate is carried out with sodium particles.

5. The process according to claim 1, wherein the pretreatment of the isoprene concentrate is carried out with sodium particles dispersed in paraffinic oil.

6. The process according to claim 5, wherein the sodium dispersion is obtained by thoroughly mixing molten sodium into the paraffinic oil, at a temperature of from 150° to 200° C., until the sodium particles have a size in the range of from 5 to 50 micron.

7. The process according to claim 6, wherein the active sodium concentration is adjusted to between 0.5 and 2.0 wt %, relative to the weight of the total reaction mixture.

8. The process according to claim 7, wherein the pretreatment of the isoprene concentrate is carried out at a temperature in the range of from 50° to 55° C.

9. The process according to claim 1, wherein the inert non-aromatic solvent used for polymerization is cyclohexane, cyclopentane, n-pentane, n-hexane, or isopentane, or mixtures thereof.

10. The process according to claim 9, wherein the solvent is cyclohexane, mixed with minor amounts of isopentane, or pure cyclopentane.

11. The process according to claim 1, wherein the initiator is sec-butyllithium.

12. The process according to claim 1, wherein linear triblock copolymers are prepared having apparent number average molecular weights in the range of from 75,000 to 270,000.

13. The process according to claim 12, wherein the apparent number average molecular weight of the poly (styrene) block segments are in the range of from 8000 to 20,000.

* * * * *